United States Patent
Yu et al.

(10) Patent No.: US 9,401,972 B2
(45) Date of Patent: Jul. 26, 2016

(54) VIRTUAL FILE TRANSMISSION SYSTEM AND METHOD OF TRANSMITTING VIRTUAL FILE THEREOF

(71) Applicant: Wistron Corporation, New Taipei (TW)

(72) Inventors: Pei-Ling Yu, New Taipei (TW); Alexander I-Chi Lai, New Taipei (TW)

(73) Assignee: Wistron Corporation, New Taipei (TW)

( * ) Notice: Subject to any disclaimer, the term of this patent is extended or adjusted under 35 U.S.C. 154(b) by 467 days.

(21) Appl. No.: 13/897,898

(22) Filed: May 20, 2013

(65) Prior Publication Data
US 2014/0082051 A1    Mar. 20, 2014

(30) Foreign Application Priority Data
Sep. 18, 2012 (TW) .............................. 101134179 A

(51) Int. Cl.
G06F 15/16  (2006.01)
H04L 29/06  (2006.01)
H04L 29/08  (2006.01)

(52) U.S. Cl.
CPC ................ *H04L 67/42* (2013.01); *H04L 67/06* (2013.01); *H04L 63/105* (2013.01)

(58) Field of Classification Search
CPC ........ H04L 63/105; H04L 67/06; H04L 67/42
See application file for complete search history.

(56) References Cited

U.S. PATENT DOCUMENTS

| | | | | |
|---|---|---|---|---|
| 8,645,511 B2* | 2/2014 | Liu | ...................... | G06F 9/44505 709/221 |
| 8,954,611 B2* | 2/2015 | Chan | ...................... | A63F 13/12 709/203 |
| 9,027,108 B2* | 5/2015 | Tan | ...................... | G06F 21/606 726/9 |
| 9,063,912 B2* | 6/2015 | Seibert, Jr. | ............ | G06F 17/212 |
| 2011/0185398 A1 | 7/2011 | Kubota | | |
| 2011/0252071 A1* | 10/2011 | Cidon | ............... | G06F 17/30174 707/802 |
| 2012/0297311 A1* | 11/2012 | Duggal | ................... | G06F 9/468 715/740 |
| 2013/0007465 A1* | 1/2013 | Movassaghi | .......... | H04L 63/105 713/186 |

FOREIGN PATENT DOCUMENTS

| TW | M354148 U | 4/2009 |
|---|---|---|
| TW | M434977 U | 8/2012 |

* cited by examiner

*Primary Examiner* — Mohamed Wasel
(74) *Attorney, Agent, or Firm* — Muncy, Geissler, Olds & Lowe, P.C.

(57) ABSTRACT

A virtual file transmission system includes a server side and a user side. The server side includes a virtual desktop generator for providing a virtual desktop and a file type manager. The user side includes a virtual desktop display module and a file execution module. A virtual desktop display module is used for displaying the virtual desktop and allowing a user to request the server side to open a file through the virtual desktop. When the server side received the request of opening the file, the file type manager determines the type and properties of the file to transmit image/sound streaming of the file to the user side to allow the virtual desktop displaying module display the streaming, or transmit the file to the user side to allow the file execution module to open the file.

19 Claims, 3 Drawing Sheets

VIRTUAL FILE TRANSMISSION SYSTEM AND METHOD OF TRANSMITTING VIRTUAL FILE THEREOF

FIELD

The present invention relates to a virtual file transmission system and a method thereof, and more particularly, to a virtual file transmission system and a method thereof which determine the transmitting mode according to the type of the file.

BACKGROUND

Due to the improvement of the computer technology and the universal of the network application, the techniques of the local area network system or the cloud system are developed vigorously. Therefore, in the prior art such as local area network system or the cloud system, the function of displaying virtual desktop has already been installed. The server system of the local area network system or the cloud system directly constructs the virtual desktop to display the virtual desktop or execute some application programs on the user device through the virtual desktop infrastructure (VDI). It is no need to download the file completely before the file is executed. Thus, the confidentiality of the file could be ensured, and the resource on the computer system of the user device could be consumed less.

However, in the prior art, the VDI would continually transmit the frame of the virtual desktop to the user device, and in order to make the user see the whole fluently virtual desktop, the refresh rate of the transmitted frame has to be kept at least 30 fps. Therefore, the data transmitting amount has to be kept high at any time, and it would occupy huge bandwidth and cause torments to the user having insufficient network bandwidth.

Therefore, there is a need for a new virtual file transmission system and method thereof to solve the problems of the prior art.

SUMMARY

The main object of the present invention is to provide a virtual file transmission system, which has a function of determining the transmitting way according to the type of the file.

Another main object of the present invention is to provide a virtual file transmission method applicable to the aforementioned system.

In order to achieve the above objects, the virtual file transmission system of the present invention comprises a server system and a user device. The server system comprises a virtual desktop generator and a file type manager. The virtual desktop generator is used for providing a virtual desktop. The file type manager is electrically connected with the virtual desktop generator. The user device is connected to the server system via a network environment for receiving the virtual desktop. The user device comprises a virtual desktop display module and a file execution module. The virtual desktop display module is used for displaying the virtual desktop and allowing a user requesting the server system to open a file through the virtual desktop. The file execution module is electrically connected with the virtual desktop display module. When the server system receives the request of opening the file, the file type manager would determine the type of the file; wherein when the file type manager confirms that the type of the file is a first type, the virtual desktop generator would open the file and convert the file into an image streaming or a sound streaming, and then transmit the image streaming or the sound streaming to the user device to enable the virtual desktop display module to display the image streaming or paly the sound streaming. When the file type manager confirms that the type of the file is a second type, the virtual desktop generator would transmit the file to the user device to enable the file execution module to open and operate the file, and display the file on the virtual desktop through the virtual desktop display module.

The virtual file transmission method of the present invention comprises the following steps: requesting the server system to open a file; determining the type of the file; when the type of the file is a first type, opening the file and converting the file into a image streaming or a sound streaming, and then transmitting the image streaming or the sound streaming to the user device; when the user device receives the image streaming or the sound streaming, playing the image streaming or the sound streaming on the virtual desktop; when the type of the file is a second type, transmitting the file to the user device; and when the user device receives the file, opening the file and operating the file on the virtual desktop.

BRIEF DESCRIPTION OF THE DRAWINGS

The exemplary embodiment(s) of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PREFERRED EMBODIMENTS

These and other objects and advantages of the present invention will become apparent from the following description of the accompanying drawings, which disclose several embodiments of the present invention. It is to be understood that the drawings are to be used for purposes of illustration only, and not as a definition of the invention.

Figure 1:
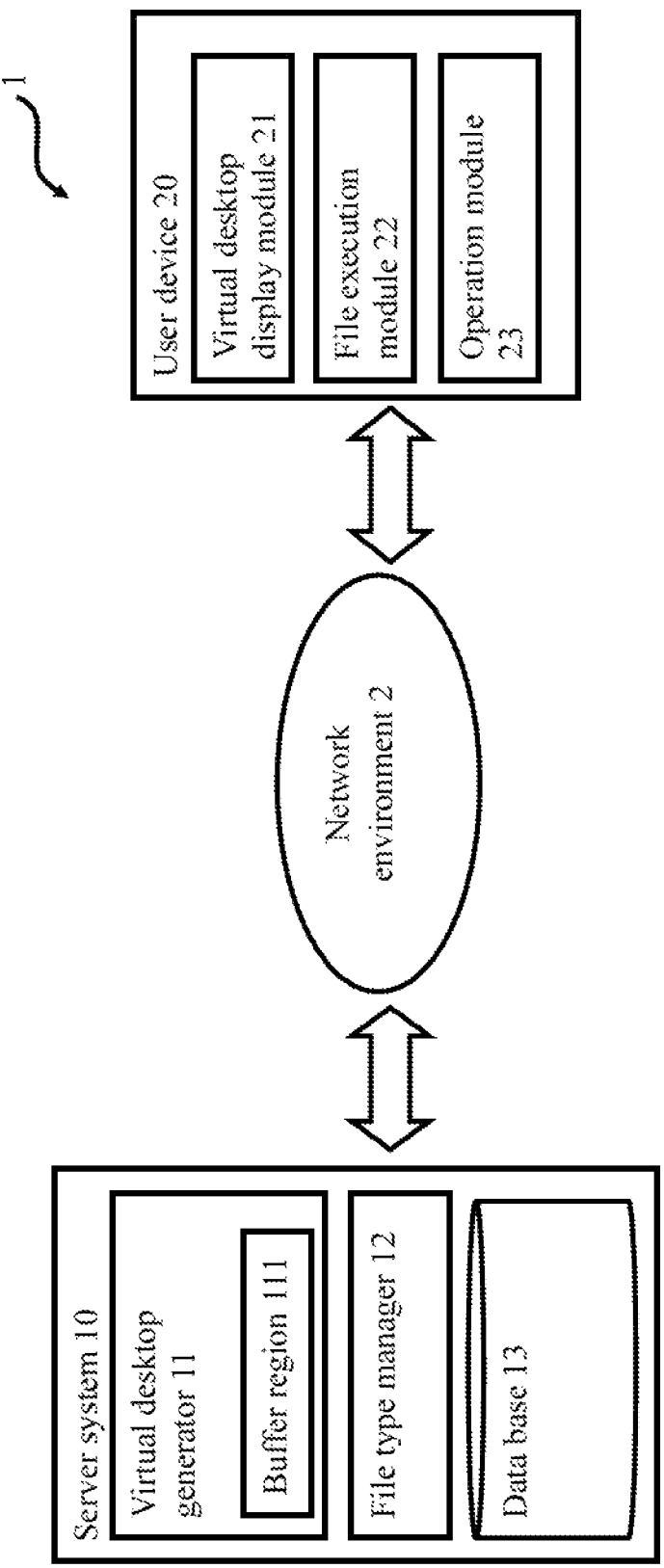
FIG. 1 is a structure schematic diagram of the virtual file transmission system of the present invention.

Please refer to FIG. 1, which is a structure schematic diagram of the virtual file transmission system of the present invention.

The virtual file transmission system 1 of the present invention is a virtual desktop application system, which is applicable to environments such as a company internal network or a cloud system, thus the virtual file transmission system 1 could include a server system 10 and a user device 20. The server system 10 and the user device 20 connect to each other via a network environment 2, and the data is transmitted through the network environment 2. The server system 10 could be a server of an internal network, or a server of a cloud network, but the present invention is not limited within these examples. The user device 20 provided for user operating could be a system such as a desktop computer, a laptop, a tablet or a smart phone, but the present invention is not limited within the aforementioned apparatuses. The server system 10 connects to the user device 20 to provide and transmit the virtual desktop to the user device 20, thus the user could operate the virtual desktop on the user device 20. It has to be noted here that the server system 10 could connect to several user devices 20, or only to single user device 20. When the server system 10 connects to several user devices 20, the server system 10 transmits different virtual desktop to different user devices 20 according to different users' operation. Because the operation mechanism of multiple user devices 20 is similar to the operation mechanism of single user device 20, the present invention would just explain the example of single user device 20 hereinafter.

The server system 10 includes a virtual desktop generator 11, a file type manager 12 and a data base 13, which are electrically connected with each other. The virtual desktop generator 11 is constructed by hardware or software cooperated with hardware. The virtual desktop generator 11 provides a virtual desktop to each user device 20, for example, using virtual desktop infrastructure (VDI) to construct the virtual desktop for the user to use on the user device 20. The virtual desktop generator 11 further includes many application programs to provide different software functions. When a user uses the virtual desktop on the user device 20 to execute a command, for example to open a file, the user device 20 would first request the server system 10 to transmit the file. At this moment, the virtual desktop generator 11 could use the included application program or operating system to open the file. Because the theory of the virtual desktop has been known by those skilled in the art, here the theory would not be described.

The file type manager 12 is electrically connected with the virtual desktop generator 11, and the file type manager 12 could be constructed by hardware or software cooperated with hardware. When the virtual desktop generator 11 receives the command of opening the file from the user device 20, the file type manager 12 would first determine whether the type of the file is a first type or a second type. For example, the file type manager 12 could first read the metadata of the file, and then compare the metadata with the data stored in the data base 13 of the server system 10 to determine the confidential level of the file. Or the file type manager 12 would analyze the environment of the user device 20 and the source of the file, for example, the file type manager 12 would determine whether the source of the file comes from an external connection so as to decide the risk level of the file. Besides, the file type manager 12 could also first determine the confidential level of the file, and then analyze the environment of the user device 20 and the source of the file, thus various file type could be adapted.

In one embodiment of the present invention, the file type manager 12 categorizes the file into a first type or a second type according to the confidential level of the file. Therefore, when the file type manager 12 determines the file is the first type, i.e. the file is a secret material. At the moment, the virtual desktop generator 11 would first open the file by using the application program included in the virtual desktop generator 11, and then convert the file into an image or a sound and store the image or the sound in a buffer region 111. After that, the virtual desktop generator 11 would transmit the image or the sound to the user device 20 continually and instantly through a streaming way. The virtual desktop generator 11 is able to generate the image streaming and the sound streaming at same time according to the type of the file, or the virtual desktop generator 11 generates only one of the streaming, the present invention does not limit it. On the other hand, when the file type manager 12 determines the file is the second type, i.e. the file is not a secret data, the virtual desktop generator 11 would transmit the file to the user device 20 to enable the user to operate the file on the user device 20 directly. In addition, the file type manager 12 could further categorize the file into a third type or a fourth type according to the environment of the user device 20 and the source of the file. The process flow to different types of the file would be described following with the steps or procedures of the present invention, and it would not be mentioned here.

The user device 20 includes a virtual desktop display module 21, a file execution module 22 and an operation module 23, which are electrically connected with each other. The virtual desktop display module 21 could be constructed by hardware or software cooperated with hardware. The virtual desktop display module 21 is used for displaying the virtual desktop transmitted from the server system 10 to enable the user operating the virtual desktop directly, and enable the user to open the file by requesting the server system 10 via the virtual desktop. After that, the processing procedures on the server system 10 would be the file type manager 12 determining the type of the data to be transmitted to the user device 20 according to the type of the file. When the server system 10 transmits the image streaming or the sound streaming, the virtual desktop display module 21 directly displays the image streaming or plays the sound streaming on the virtual desktop to allow the user watching the image streaming or listening to the sound streaming.

The file execution module 22 is electrically connected to the virtual desktop display module 21, and the file execution module 22 could be constructed by hardware or software cooperated with hardware. When the user device 20 receives the file from the server system 10, the file execution module 22 would call a corresponding application program of the user device 20 to open the file. The application program could be a window independent to the virtual desktop display module 21, and also could be a plug-in embedded in the virtual desktop display module 21, thus the file could be displayed on the virtual desktop. The operation module 23 is electrically connected to the virtual desktop display module 21, and the operation module 23 could be constructed by hardware or software cooperated with hardware. The operation module 23 is provided to the user for operating the file when watching the image streaming or listening to the sound streaming, and an operation signal could be transmitted back to the server system 10 via the operation module 23 to enable the virtual desktop generator 11 generating a new image streaming or a new sound streaming according to the operation signal. For example, when the user wants to change the page during watching the image streaming, the operation module 23 would generate an operation signal of changing page according to the operation by the user, and transmit the operation signal back to the server system 10. The virtual desktop generator 11 of the server system 10 would generate a new image streaming or a new sound streaming according to the operation signal, and then transmits the new image streaming or the new sound streaming back to the user device 20, thus an interactive result could be provided to the user. Besides, when the file execution module 22 directly opens the file, the user could also edit the file via the operation module 23. After the user editing the file, the operation module 23 transmits the updated file back to the server system 10 to be stored in the server system 10.

Figure 2:
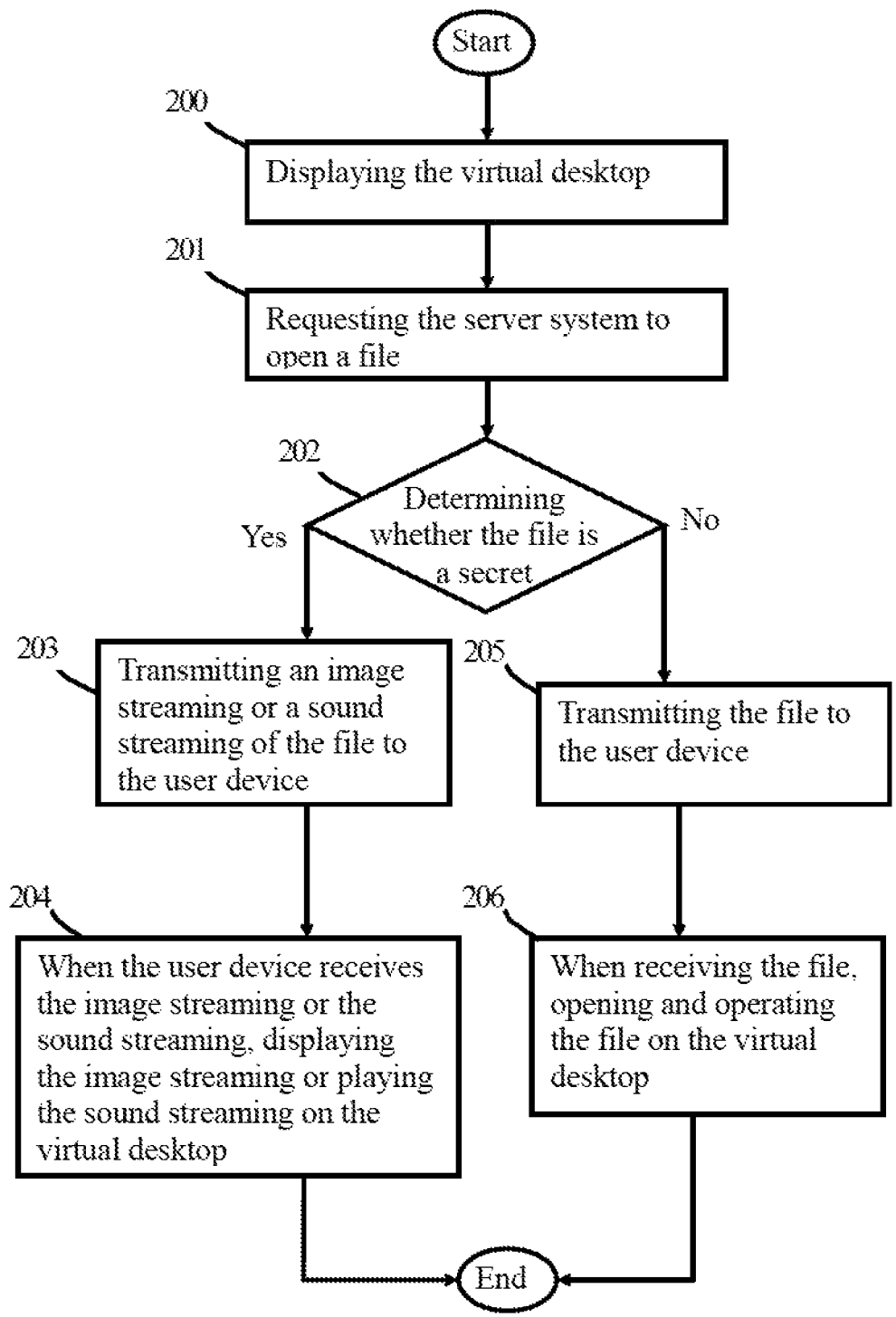
FIG. 2 is a flow chart of a first embodiment of the virtual file transmission method of the present invention.

Next please refer to FIG. 2, which is a flow chart of the first embodiment of the virtual file transmission method in accordance with the present invention. It has to be noted here that though the virtual file transmission method of the present invention is described following by taking the virtual file transmission system 1 as an example, the virtual file transmission method of the present invention is not limited to be applied on the aforementioned virtual file transmission system 1.

First, execute the step 200: displaying the virtual desktop.

The virtual desktop generator 11 of the server system 10 first constructs a virtual desktop and then the virtual desktop is transmitted to the user device 20, thus making the virtual desktop display module 21 of the user device 20 display the virtual desktop to allow the user to operate the virtual desktop.

Following, execute the step 201: requesting the server system to open a file.

At this moment, the user device 20 could request the server system 10 to open the file according to the operation made by the user on the virtual desktop. In the first embodiment of the present invention, an example of requesting the server system 10 to open a text file would be described.

Next, execute the step 202: determining whether the file is a secret.

Secondly, when the server system 10 receives the command of opening the file, the file type manager 12 of the server system 10 would first confirm the type of the file to determine whether the file is the first type or the second type. In the first embodiment of the present invention, the file type manager 12 would first determine the confidential level of the file to make sure whether the file is a secret file. If the file is a secret file, the file type manager 12 determines the file is the first type; if the file is not a secret file, the file type manager 12 determines the file is the second type.

When the type of the file is the first type, execute the step 203: transmitting an image streaming or a sound streaming of the file to the user device.

Due to the file in the first embodiment of the present invention is a text file, the virtual desktop generator 11 would open the text file at this time and convert the text file into an image streaming, and then store the image streaming in the buffer region 111. Further, the image streaming is transmitted to the user device 20. When the file includes sounds, the virtual desktop generator 11 also converts the sounds into a sound streaming, and transmits the sound streaming to the user device 20.

Further execute the step 204: when the user device receives the image streaming or the sound streaming, displaying the image streaming or playing the sound streaming on the virtual desktop.

When the user device 20 receives the image streaming, the virtual desktop display module 21 would display the image streaming on the virtual desktop to enable the user to watch. Further, the user could operate the image streaming via the operation module 23, and then the operation signal would be transmitted back to the server system 10, thereby making the virtual desktop generator 11 generate a new image streaming according to the operation signal. Similarly, when the file includes sounds, the user device 20 would receive the sound streaming to allow the virtual desktop display module 21 to play the sound streaming. At the same time, the user could further operate the operation module 23 to make the virtual desktop generator 11 generate a new sound streaming according to the operation signal.

Besides, when the type of the file is the second type, execute the step 205: transmitting the file to the user device.

When the file type manager 12 confirms that the file is not a secret file, the virtual desktop generator 11 would directly transmit the file to the user device 20. For example, the virtual desktop generator 11 directly transmits the file having an extension of ".txt" to the user device 20.

Final, execute the step 206: when receiving the file, opening and operating the file on the virtual desktop.

After the user device 20 receiving the file, the file execution module 22 directly opens the file and displays the file on the virtual desktop or the independent window. The user thus is allowed to edit the file on the virtual desktop via the operation module 23, and then transmit the edited file back to the server system 10 for storing.

Figure 3:
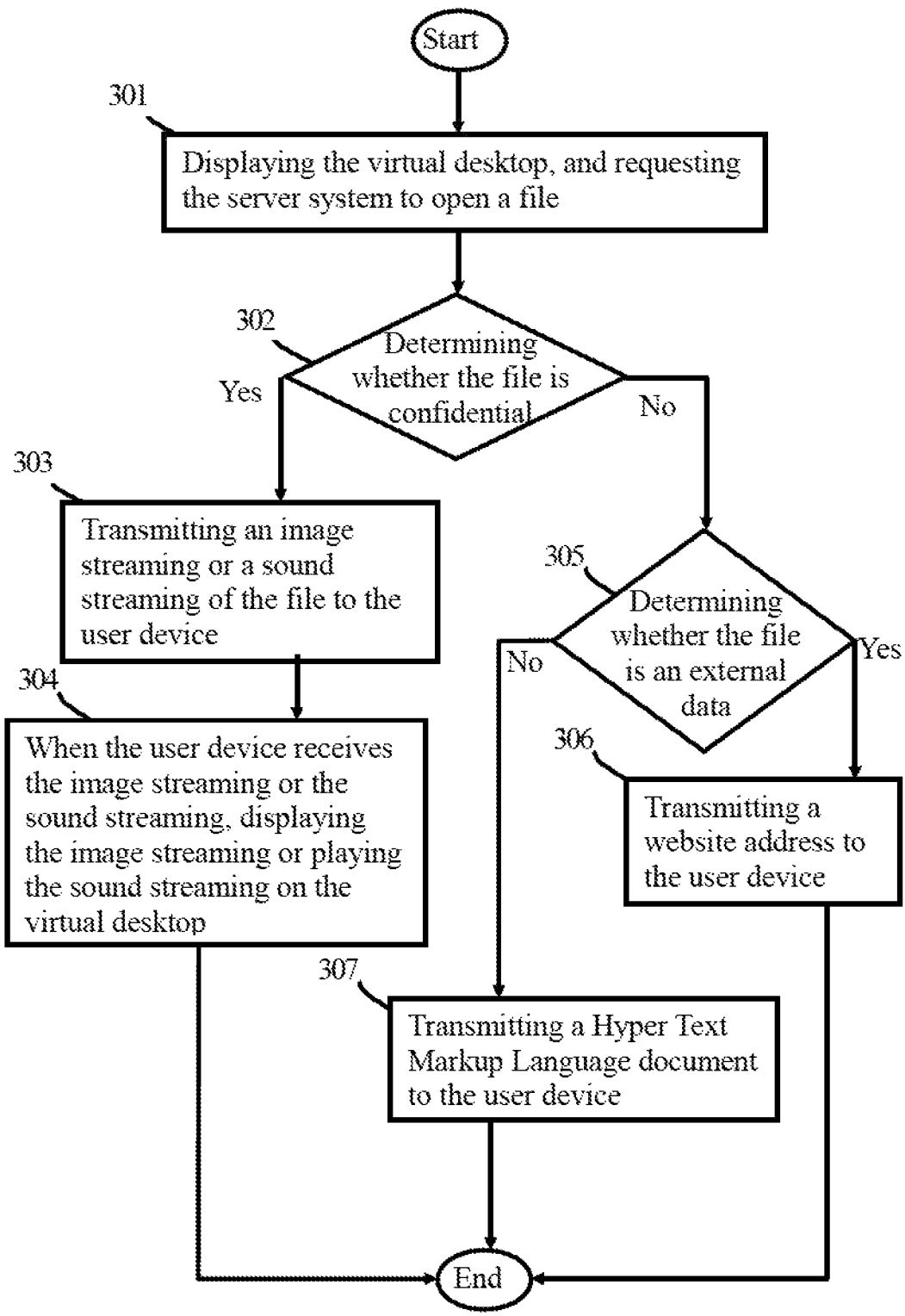
FIG. 3 is a flow chart of a second embodiment of the virtual file transmission method of the present invention.

Following please refer to FIG. 3, which is a flow chart of the second embodiment of the virtual file transmission method in accordance with the present invention.

In the second embodiment of the present invention, a website connection is used as an example of the file for description, but the file of the present invention is not limited within the above examples.

First, execute the step 301: displaying the virtual desktop, and requesting the server system to open a file.

First, the same with the step 200 to step 201, make the virtual desktop display module 21 of the user device 20 display the virtual desktop, and the user is allowed to request the server system 10 to open a file.

Next, execute the step 302: determining whether the file is confidential.

The file type manager 12 then determines the type of the file. In the second embodiment, the file type manager 12 first determines whether the website connection is a confidential connection.

If the website connection is a confidential connection, the file type manager 12 would confirm that the file is the firs type and then execute the step 303: transmitting an image streaming or a sound streaming of the file to the user device.

At this time, the virtual desktop generator 11 opens the connection and captures the image on the website to generate the image streaming or the sound streaming, and stores these streaming in the buffer region 111. Then the image streaming or the sound streaming is transmitted to the user device 20.

Further, execute the step 304: when the user device receives the image streaming or the sound streaming, displaying the image streaming or playing the sound streaming on the virtual desktop.

When the user device 20 receives the image streaming, the virtual desktop display module 21 would display the image streaming or play the sound streaming on the virtual desktop. Because the above steps 302 to 304 are similar to the steps 202 to 204, these steps would not be described here.

When this connection is not a confidential connection, the file type manager 12 would confirm this file is the second type, and then execute the step 305: determining whether the file is an external data.

When the connection of the file is not confidential, the file type manager 12 then determines whether the file is an external data, so as to further categorize the file into the third type or the fourth type.

If the connection of the file is the external connection, then the file type manager 12 would determine the type of the file is the third type, and then execute the step 306: transmitting a website address to the user device.

When the file type manager 12 determines the connection of the file is the external connection, such as the homepage of Google® (http://www.google.com), the virtual desktop generator 11 would directly transmit the website address to the user device 20 to allow the file execution module 22 executing the website address and let the user connecting to the external website and opening the webpage.

Final, when the connection of the file is not the external connection, the file type manager 12 would confirm the type of the file is the fourth type, and thus execute the step 307: transmitting a Hyper Text Markup Language (HTML) document to the user device.

When the connection of the file is not the external connection, virtual desktop generator 11 would obtain the Hyper Text Markup Language (HTML) document from the website pointed by the hyperlink, and then transmit the document to the user device 20, so as to make the file execution module 22 of the user device 20 to open this document.

It has to be noted here that the virtual file transmission method of the present invention is not limited by the above step sequences. The above step sequences could be changed in order to achieve the object of the present invention.

Via the virtual file transmission system 1 of the present invention, there could be different process flow according to different file type, so as to decrease the data transmission quantity without affecting the fluency of using the virtual desktop.

It is noted that the above-mentioned embodiments are only for illustration. It is intended that the present invention cover modifications and variations of the present invention provided they fall within the scope of the following claims and their equivalents. Therefore, it will be apparent to those skilled in the art that various modifications and variations can be made to the structure of the present invention without departing from the scope or spirit of the invention.

The invention claimed is:

1. A virtual file transmission system, comprising:
a server system, comprising:
a virtual desktop generator for providing a virtual desktop; and
a file type manager electrically connected with the virtual desktop generator; and
a user device, connected to the server system via a network environment for receiving the virtual desktop, the user device comprising:
a virtual desktop display module for displaying the virtual desktop and allowing a user requesting the server system to open a file through the virtual desktop;
a file execution module electrically connected with the virtual desktop display module;
wherein when the server system receives the request of opening the file, the file type manager would determine the type of the file; when the file type manager confirms that the type of the file is a first type, the virtual desktop generator would open the file and convert the file into an image streaming or a sound streaming, and then transmit the image streaming or the sound streaming to the user device to enable the virtual desktop display module to display the image streaming or play the sound streaming; when the file type manager confirms that the type of the file is a second type, the virtual desktop generator would transmit the file to the user device to enable the file execution module to open and operate the file, and display the file on the virtual desktop through the virtual desktop display module; and
an operation module for allowing the user device to operate the image streaming or the sound streaming on the virtual desktop and transmits an operation signal back to the server system, and then the virtual desktop generator generates a new image streaming or a new sound streaming according to the operation signal.

2. The virtual file transmission system as claimed in claim 1, wherein the server system comprises a data base, the file type manager looks up the data base to determine the type of the file according to a metadata of the file.

3. The virtual file transmission system as claimed in claim 2, wherein the file type manager is used for determining whether the file is a secret data; if the file is the secret data, the file type manager would confirm the type of the file is the first type; if the file is not the secret data, the file type manager would confirm the type of the file is the second type.

4. The virtual file transmission system as claimed in claim 3, wherein if the type of the file is the second type, the file type manager would further determine whether the file comes from an external link; if the file comes from the external link, the file type manager would confirm the type of the file is a third type; if the file does not come from the external link, the file type manager would confirm the type of the file is a fourth type.

5. The virtual file transmission system as claimed in claim 4, wherein when the type of the file is the third type, the virtual desktop generator would transmit a webpage address to the user device.

6. The virtual file transmission system as claimed in claim 5, wherein when the type of the file is the fourth type, the virtual desktop generator would transmit a Hyper Text Markup Language file to the user device.

7. The virtual file transmission system as claimed in claim 1, wherein the file type manager is used for determining whether the file is a secret data; if the file is the secret data, the file type manager would confirm the type of the file is the first type; if the file is not the secret data, the file type manager would confirm the type of the file is the second type.

8. The virtual file transmission system as claimed in claim 7, wherein if the type of the file is the second type, the file type manager would further determine whether the file comes from an external link; if the file comes from the external link, the file type manager would confirm the type of the file is a third type; if the file does not come from the external link, the file type manager would confirm the type of the file is a fourth type.

9. The virtual file transmission system as claimed in claim 8, wherein when the type of the file is the third type, the virtual desktop generator would transmit a webpage address to the user device.

10. The virtual file transmission system as claimed in claim 9, wherein when the type of the file is the fourth type, the virtual desktop generator would transmit a Hyper Text Markup Language file to the user device.

11. The virtual file transmission system as claimed in claim 1, wherein the file execution module executes the opening and the operation to the file through an independent window showed on the virtual desktop.

12. The virtual file transmission system as claimed in claim 1, wherein the user device further comprises an operation module for allowing the user to edit the file after opening the file, and transmits an updated file back to the server system.

13. A virtual file transmission method, applied to a virtual file transmission system, the virtual file transmission system comprising a server system and an user device, wherein the server system is used for providing a virtual desktop, the user device connects to the server system through a network environment for allowing a user using the virtual desktop; the virtual file transmission method comprising the following steps:
requesting the server system to open a file;
determining the type of the file; when the type of the file is a first type, opening the file and converting the file into an image streaming or a sound streaming, and then transmitting the image streaming or the sound streaming to the user device;
when the user device receives the image streaming or the sound streaming, playing the image streaming or the sound streaming on the virtual desktop;
allowing the user device to operate the image streaming or the sound streaming on the virtual desktop and transmits an operation signal back to the server system;

generating a new image streaming or a new sound streaming according to the operation signal;

when the type of the file is a second type, transmitting the file to the user device; and when the user device receives the file, opening and operating the file on the virtual desktop.

14. The virtual file transmission method as claimed in claim 13, further comprising the following steps:

determining whether the file is a secret data;

if the file is the secret data, confirming the type of the file is the first type; and if the file is not the secret data, confirming the type of the file is the second type.

15. The virtual file transmission method as claimed in claim 14, wherein if the type of the file is confirmed as the second type, then the method further comprises the following steps:

determines whether the file comes from an external link;

if the file comes from the external link, confirming the type of the file is a third type; and if the file does not come from an external link, confirming the type of the file is a fourth type.

16. The virtual file transmission method as claimed in claim 15, further comprising the following step:

when the type of the file is the third type, transmitting a webpage address to the user device.

17. The virtual file transmission method as claimed in claim 16, further comprising the following step:

when the type of the file is the fourth type, transmitting a Hyper Text Markup Language file to the user device.

18. The virtual file transmission method as claimed in claim 13, wherein after the file is opened and operated on the virtual desktop, the method further comprises the following step:

providing the user editing the file on the virtual desktop, and transmitting an updated file back to the server system.

19. The virtual file transmission method as claimed in claim 13, wherein after the file is opened and operated on the virtual desktop, the method further comprises the following step:

displaying the file on the virtual desktop via an independent window.

* * * * *